US012773994B2

(12) United States Patent
Yamazaki

(10) Patent No.: US 12,773,994 B2
(45) Date of Patent: Oct. 27, 2026

(54) DRIVING ASSISTANCE DEVICE, DRIVING ASSISTANCE METHOD, AND STORAGE MEDIUM

(71) Applicant: HONDA MOTOR CO., LTD., Tokyo (JP)

(72) Inventor: Taku Yamazaki, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 90 days.

(21) Appl. No.: 18/891,927

(22) Filed: Sep. 20, 2024

(65) Prior Publication Data

US 2025/0108808 A1 Apr. 3, 2025

(30) Foreign Application Priority Data

Sep. 29, 2023 (JP) ................................ 2023-170823

(51) Int. Cl.
*B60W 30/18* (2012.01)
*B60W 30/09* (2012.01)
(Continued)

(52) U.S. Cl.
CPC ...... *B60W 30/18154* (2013.01); *B60W 30/09* (2013.01); *B60W 30/0953* (2013.01);
(Continued)

(58) Field of Classification Search
CPC ....... B60W 30/18154; B60W 60/0015; B60W 60/00272; B60W 30/09; B60W 30/0956;
(Continued)

(56) References Cited

U.S. PATENT DOCUMENTS 7,304,589 B2 * 12/2007 Kagawa ............... G08G 1/0965 340/995.13
9,830,822 B2 11/2017 Ando et al.
(Continued)

FOREIGN PATENT DOCUMENTS

JP 2017-091502 A 5/2017
JP 2017-111576 A 6/2017
(Continued)

OTHER PUBLICATIONS

Hagiwara et al., Driving support device, vehicle, and driving support method, 2022 (JP2022-138594A) translated version, pp. 1-18 (pdf).*

(Continued)

*Primary Examiner* — Manglesh M Patel
(74) *Attorney, Agent, or Firm* — THOMAS | HORSTEMEYER, LLP

(57) ABSTRACT

The present invention provides a driving assistance device that performs driving assistance for the self-vehicle based on a plurality of intersection locations each indicating a location where a traveling trajectory of a self-vehicle and a traveling trajectory of another vehicle intersect in a past, wherein the device is configured to: acquire surrounding vehicle information including a traveling trajectory of a surrounding vehicle present around the self-vehicle; determine, as a candidate point, a point at which the self-vehicle starts to accelerate after decelerating to a speed threshold value or less; specify, as a new intersection location, a location where the traveling trajectories of the self-vehicle and the surrounding vehicle intersect in a case of determining that the surrounding vehicle has passed through a predetermined area set for the candidate point; and register the specified new intersection location.

11 Claims, 12 Drawing Sheets

(51) Int. Cl.
*B60W 30/095* (2012.01)
*B60W 60/00* (2020.01)
*G08G 1/0967* (2006.01)

(52) U.S. Cl.
CPC .... *B60W 30/0956* (2013.01); *B60W 60/0015* (2020.02); *B60W 60/00272* (2020.02); *B60W 2554/4045* (2020.02)

(58) Field of Classification Search
CPC ........... G08G 1/096716; G08G 1/0967; G08G 1/096791; G05D 1/0061; G05D 1/0088; G05D 1/021; G05D 1/0214; G05D 1/0221; G05D 1/0223
See application file for complete search history.

(56) References Cited

U.S. PATENT DOCUMENTS

| | | | | |
|---|---|---|---|---|
| 10,269,247 | B2 | 4/2019 | Ando | |
| 10,304,337 | B2 | 5/2019 | Ando | |
| 11,100,804 | B2 | 8/2021 | Kurehashi | |
| 12,208,793 | B2 | 1/2025 | Hagiwara et al. | |
| 2015/0254977 | A1 * | 9/2015 | Grabow | G08G 1/161 340/903 |
| 2017/0132930 | A1 * | 5/2017 | Ando | G08G 1/163 |
| 2018/0075309 | A1 * | 3/2018 | Sathyanarayana | G05D 1/0055 |
| 2019/0287406 | A1 | 9/2019 | Kurehashi | |
| 2022/0289210 | A1 | 9/2022 | Hagiwara et al. | |

FOREIGN PATENT DOCUMENTS

| | | | | | |
|---|---|---|---|---|---|
| JP | 2017-126219 | A | | 7/2017 | |
| JP | 7054636 | B2 | | 4/2022 | |
| JP | 2022-138596 | A | | 9/2022 | |
| JP | 2022138594 | A | * | 9/2022 | B60W 40/04 |

OTHER PUBLICATIONS

Japanese Office Action for Japanese Patent Application No. 2023-170823 mailed May 30, 2025 (partially translated).

* cited by examiner

FIG. 2

| INTERSECTION POSITION ID | REGISTRATION DATE AND TIME | COORDINATES | PASSING AZIMUTH |
|---|---|---|---|
| 0001 | 2022/09/aa | P1 (X1, Y1) | 21° |
| 0002 | 2022/09/bb | P2 (X2, Y2) | 285° |
| 0003 | 2022/10/cc | P3 (X3, Y3) | 53° |
| 0004 | 2022/11/dd | P4 (X4, Y4) | 92° |
| ⋮ | | | |
| nnnn | 2023/08/ee | Pn(Xn, Yn) | 165° |
| ⋮ | | | |

DRIVING ASSISTANCE DEVICE, DRIVING ASSISTANCE METHOD, AND STORAGE MEDIUM

CROSS-REFERENCE TO RELATED APPLICATION(S)

This application claims priority to and the benefit of Japanese Patent Application No. 2023-170823 filed on Sep. 29, 2023, the entire disclosure of which is incorporated herein by reference.

BACKGROUND OF THE INVENTION

Field of the Invention

The present invention relates to a driving assistance device, a driving assistance method, and a storage medium.

Description of the Related Art

There is known a device that performs driving assistance for preventing a collision with another vehicle (surrounding vehicle) or the like without using map information. Japanese Patent No. 7054636 discloses a driving assistance device that registers, in a storage unit, location information of an intersection where a traveling trajectory of a self-vehicle and a traveling trajectory of another vehicle intersect and performs driving assistance for the self-vehicle when the self-vehicle passes through the intersection again.

The driving assistance device predicts a possibility of collision of the self-vehicle in the target area in front of the self-vehicle, and performs driving assistance for the self-vehicle based on the prediction result. In addition, the driving assistance driving assistance device changes the degree of driving assistance for the self-vehicle according to whether or not an intersection location between the traveling trajectory of the self-vehicle and the traveling trajectory of another vehicle specified and registered (stored) in the past is present in the target area. However, if the intersection location is not appropriately specified, for example, if the intersection location is excessively specified for a point at which the necessity of driving assistance is relatively low or if the intersection location is not specified for a point at which the necessity of driving assistance is relatively high, it may be difficult to appropriately perform driving assistance.

SUMMARY OF THE INVENTION

The present invention provides, for example, an advantageous technique for appropriately performing driving assistance for a self-vehicle.

According to one aspect of the present invention, there is provided a driving assistance device that includes a storage unit configured to store a plurality of intersection locations each indicating a location where a traveling trajectory of a self-vehicle and a traveling trajectory of another vehicle intersect in a past and performs driving assistance for the self-vehicle based on each of the plurality of intersection locations, the device comprising: an acquisition unit configured to acquire surrounding vehicle information including a traveling trajectory of a surrounding vehicle present around the self-vehicle, from the surrounding vehicle, through vehicle-to-vehicle communication; a determination unit configured to determine, as a candidate point for specifying a location where the self-vehicle and the surrounding vehicle intersect, a point at which the self-vehicle starts to accelerate after decelerating to a speed threshold value or less or a point at which the self-vehicle temporarily stops; a specifying unit configured to specify, as a new intersection location, a location where the traveling trajectory of the self-vehicle and the traveling trajectory of the surrounding vehicle intersect in a case of determining that the surrounding vehicle has passed through a predetermined area set for the candidate point based on the surrounding vehicle information acquired by the acquisition unit; and a registration unit configured to register, in the storage unit, the new intersection location is specified by the specifying unit.

Further features of the present invention will become apparent from the following description of exemplary embodiments with reference to the attached drawings.

BRIEF DESCRIPTION OF THE DRAWINGS

FIG. 2 is a diagram illustrating a configuration example of an intersection location database;

DESCRIPTION OF THE EMBODIMENTS

Figure 1:
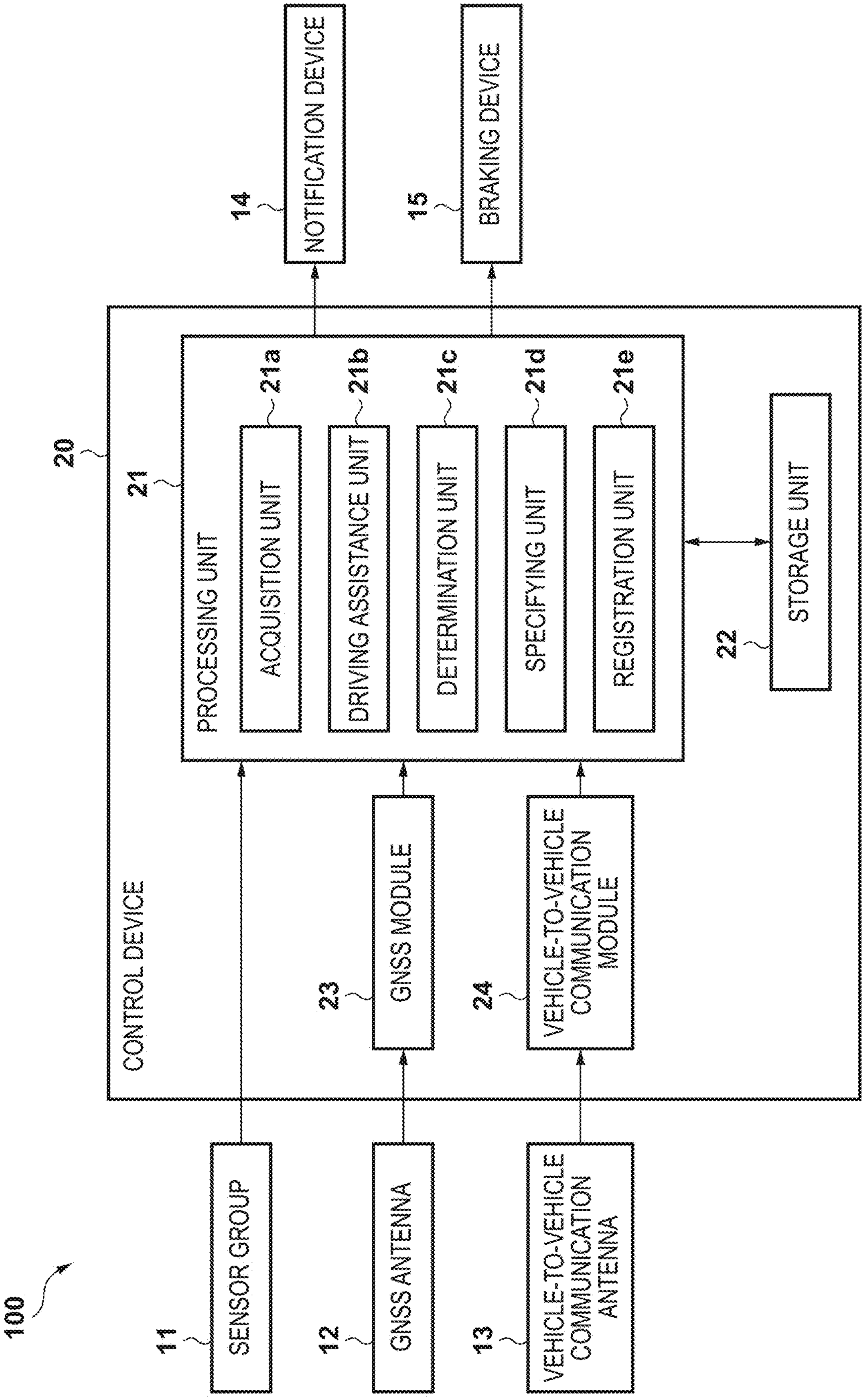
FIG. 1 is a diagram illustrating a configuration example of a driving assistance device according to an embodiment of the present invention.

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

Configuration of Driving Assistance Device

FIG. 1 is a diagram illustrating a configuration example of a driving assistance device 100 according to an embodiment of the present invention. The driving assistance device 100 is a device mounted on a self-vehicle in order to perform driving assistance for the self-vehicle. In the case of the present embodiment, the driving assistance device 100 performs collision prevention assistance for preventing (reducing) a collision with a surrounding vehicle as driving assistance for the self-vehicle without using map information. In addition, the driving assistance device 100 according to the present embodiment may include a sensor group 11, a global navigation satellite system (GNSS) antenna 12, a vehicle-to-vehicle communication antenna 13, a notification device 14, a braking device 15, and a control device 20. Note that, in the following description, "another vehicle" indicates all vehicles different from the self-vehicle, and specifically, can be defined as a vehicle that performs vehicle-to-vehicle communication with the self-vehicle. In addition, the "surrounding vehicle" indicates a vehicle that is currently present around the self-vehicle, and specifically, is defined as a vehicle that currently performs vehicle-to-vehicle communication with the self-vehicle.

The sensor group 11 includes various sensors mounted on the self-vehicle in order to perform driving assistance for the self-vehicle. For example, the sensor group 11 may include a speed sensor that detects the speed of the self-vehicle, an acceleration sensor that detects the acceleration of the self-vehicle, and the like. In addition, the sensor group 11 may include an external detection sensor such as a camera, a millimeter wave radar, or a light detection and ranging (LiDAR) capable of detecting an object around the self-vehicle. The sensor group 11 outputs the detection result to the control device 20.

The GNSS antenna 12 receives a radio wave for location measurement transmitted from a GNSS satellite. For example, the GNSS antenna 12 may be used to acquire information regarding the current location of the self-vehicle. The vehicle-to-vehicle communication antenna 13 is an antenna that transmits and receives various kinds of data to and from surrounding vehicles. For example, the vehicle-to-vehicle communication antenna 13 may be used to acquire information regarding the current location, speed, and traveling trajectory of a surrounding vehicle.

The notification device 14 is a device that provides notification to an occupant (for example, a driver) of the self-vehicle. When there is a possibility that the self-vehicle collides with a surrounding vehicle, the driving assistance device 100 according to the present embodiment can notify the occupant of the self-vehicle of the possibility of collision with the surrounding vehicle, as driving assistance, through the notification device 14. For example, the notification device 14 may include a display unit, such as a display, and display information indicating a possibility of collision with a surrounding vehicle on the display unit, or may include a sound output unit, such as a speaker, and output information indicating a possibility of collision with a surrounding vehicle from the sound output unit by sound or the like.

The braking device 15 is, for example, a brake, and is a device for performing a braking operation of the self-vehicle. When there is a possibility that the self-vehicle collides with a surrounding vehicle, the driving assistance device 100 according to the present embodiment can perform deceleration assistance for the self-vehicle by operating the braking device 15 as driving assistance, thereby avoiding a collision with the surrounding vehicle.

The control device 20 is a device (computer) that controls driving assistance for the self-vehicle, and may be, for example, an electric control unit (ECU). The control device 20 according to the present embodiment performs driving assistance by vehicle-to-vehicle communication with another vehicle (surrounding vehicle) and processing in the self-vehicle. That is, the control device 20 performs driving assistance without using map information. The control device 20 includes a processing unit 21, a storage unit 22, a GNSS module 23, and a vehicle-to-vehicle communication module 24, which are connected to each other by a bus (not illustrated).

The processing unit 21 is a processor represented by a central processing unit (CPU), and executes a program stored in the storage unit 22. The storage unit 22 includes, for example, a RAM, a ROM, and a hard disk, and stores various kinds of data in addition to a program (driving assistance program) for the processing unit 21 to perform driving assistance processing for the self-vehicle and a program (learning program) for the processing unit 21 to learn a new intersection location. In the case of the present embodiment, the storage unit 22 stores a database (information) of a plurality of intersection locations each indicating a location where the traveling trajectory of the self-vehicle and the traveling trajectory of another vehicle intersected in the past. In addition, the GNSS module 23 receives location information and the like of the self-vehicle from the GNSS satellite through the GNSS antenna 12. In addition, the vehicle-to-vehicle communication module 24 receives various kinds of information from another vehicle through the vehicle-to-vehicle communication antenna 13.

The processing unit 21 according to the present embodiment may include an acquisition unit 21*a*, a driving assistance unit 21*b*, a determination unit 21*c*, a specifying unit 21*d*, and a registration unit 21*e* in order to perform driving assistance (collision prevention assistance in the present embodiment) for the self-vehicle. In addition, the processing unit 21 is not limited to the configuration including the units 21*a* to 21*e*, and another unit may be added or some units may be omitted according to the type of driving assistance performed by the self-vehicle.

The acquisition unit 21*a* acquires surrounding vehicle information including the current location, speed, and traveling trajectory of the surrounding vehicle from the surrounding vehicle through the vehicle-to-vehicle communication antenna 13 (vehicle-to-vehicle communication module 24). The acquisition unit 21*a* may also have a function of acquiring self-vehicle information including the current location, speed, and traveling trajectory of the self-vehicle through the sensor group 11 and the GNSS antenna 12 (GNSS module 23).

The driving assistance unit 21*b* predicts a possibility of collision of the self-vehicle in the target area in front of the self-vehicle based on the self-vehicle information and the surrounding vehicle information acquired by the acquisition unit 21*a*, and controls driving assistance (collision prevention assistance) for the self-vehicle based on the prediction result. The target area may be understood as an area (driving assistance area) to be subjected to driving assistance for preventing a collision between the self-vehicle and a surrounding vehicle, and hereinafter, may be simply referred to as a "target area". In the case of the present embodiment, the driving assistance unit 21*b* can perform, as driving assistance for the self-vehicle, at least one of notification to an occupant of the self-vehicle by the notification device 14 and deceleration assistance for the self-vehicle by the braking device 15.

In addition, the driving assistance unit 21*b* according to the present embodiment changes the degree of driving assistance (collision prevention assistance) of the self-vehicle according to whether or not at least one of the plurality of intersection locations stored in the storage unit 22 (database) is present in the target area. Specifically, when at least one intersection location is present in the target area, the driving assistance unit 21*b* increases the degree of driving assistance for the self-vehicle as compared with a case where there is no intersection location in the target area. Examples of increasing the degree of driving assistance for the self-vehicle include relaxing the operating conditions of the driving assistance so that the driving assistance is easier to activate, increasing the notification level in the notification device 14, and increasing the deceleration of the self-vehicle by the braking device 15. Examples of relaxing the operating conditions of the driving assistance include increasing a time threshold value for activating the driving assistance with respect to a time to collision (TTC) calculated as a collision possibility of the self-vehicle.

The determination unit 21*c* determines a candidate point for specifying the location where the self-vehicle and the surrounding vehicle intersect (hereinafter, may be simply referred to as a "candidate point"). In the case of the present embodiment, the determination unit 21*c* determines, as a candidate point, a point at which the acceleration is started after (immediately after) the self-vehicle decelerates to the speed threshold value or less or a point at which the self-vehicle temporarily stops. The speed threshold value is used to detect that the self-vehicle temporarily decelerates to check for safety in the surrounding area, for example, turning right or left, entering another road or area, or temporary stopping before a stop line, and can be set to 20 km/h as an example.

When it is determined that the surrounding vehicle has passed through a predetermined area set as a candidate point based on the self-vehicle information and the surrounding vehicle information acquired by the acquisition unit 21*a*, the specifying unit 21*d* specifies a location where the traveling trajectory of the self-vehicle and the traveling trajectory of the surrounding vehicle intersect as a new intersection location. The predetermined area, which will be described in detail later, is an area that is set to determine passage of a surrounding vehicle with the specification of a new intersection location as a trigger, and may be understood as a passage determination area. In addition, in the case of the present embodiment, the specifying unit 21*d* has a function as a setting unit that sets a predetermined area for a candidate point and a function as a determination unit that determines whether or not a surrounding vehicle has passed through the predetermined area, but the present invention is not limited thereto, and the setting unit and the determination unit may be provided separately from the specifying unit 21*d*.

When the new intersection location is specified by the specifying unit 21*d*, the registration unit 21*e* registers the new intersection location in the storage unit 22 (database). The registration unit 21*e* may register the new intersection location by adding the new intersection location specified by the specifying unit 21*d* to the storage unit 22 (database), or may register the new intersection location by correcting at least one of the plurality of intersection locations stored in the storage unit 22 with the new intersection location. In addition, the registration unit 21*e* may be understood as an update unit that updates the database of the plurality of intersection locations stored in the storage unit 22 based on the new intersection location specified by the specifying unit 21*d*.

Next, a database of a plurality of intersection locations stored in the storage unit 22 will be described. FIG. 2 illustrates a configuration example of a database of a plurality of intersection locations stored in the storage unit 22. In addition, hereinafter, a database of a plurality of intersection locations stored in the storage unit 22 may be referred to as an "intersection location database", and an intersection location registered in the intersection location database may be referred to as a "registered intersection location". In addition, the intersection location database illustrated in FIG. 2 is merely an example, and items included in the intersection location database can be changed as appropriate.

The intersection location database may include, for each registered intersection location, information regarding the intersection location ID, registration date and time, coordinates, and passing azimuth. The intersection location ID is an identification number for each registered intersection location. The registration date and time is the date and time when the registered intersection location is registered in the intersection location database. The coordinates are data for specifying the registered intersection location, and are represented by, for example, latitude and longitude data. The coordinates may include altitude data, such as an elevation, in addition to latitude and longitude data. The passing azimuth is an azimuth (direction, angle) in which the self-vehicle faces when passing through the registered intersection location, and may be understood as a traveling direction (approach azimuth) of the self-vehicle when entering the registered intersection location. In the present embodiment, the passing azimuth of the self-vehicle at the registered intersection location is defined by setting the north direction to 0°, the east direction to 90°, the south direction to 180°, and the west direction to 270°.

Figure 3B:
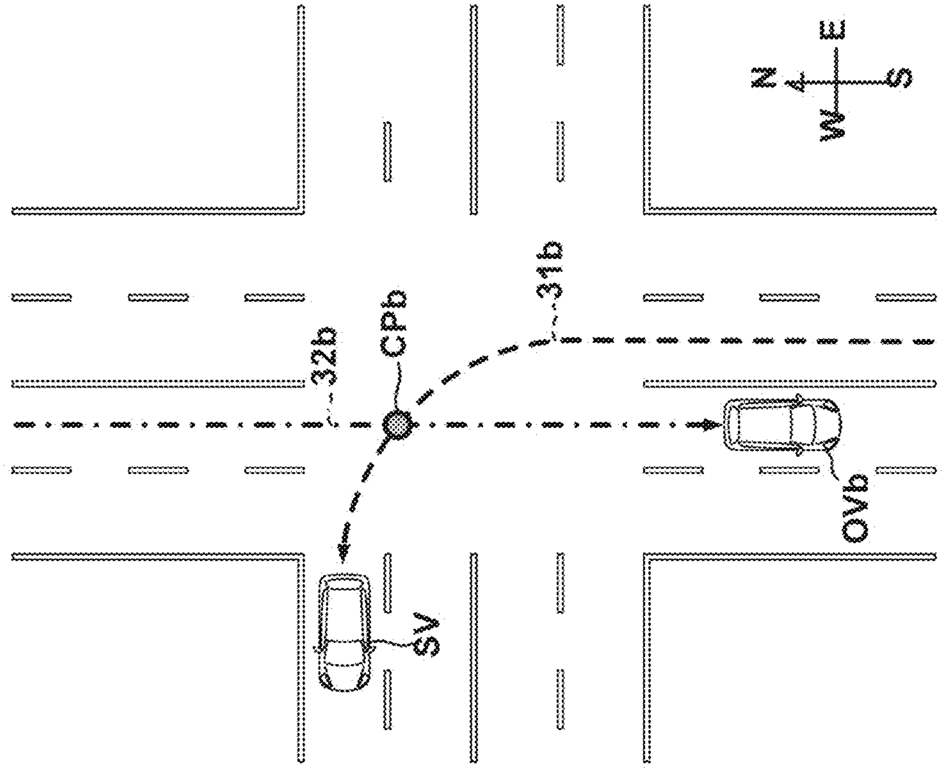
FIGS. 3A and 3B are diagrams for explaining intersection locations.
Figure 3A:
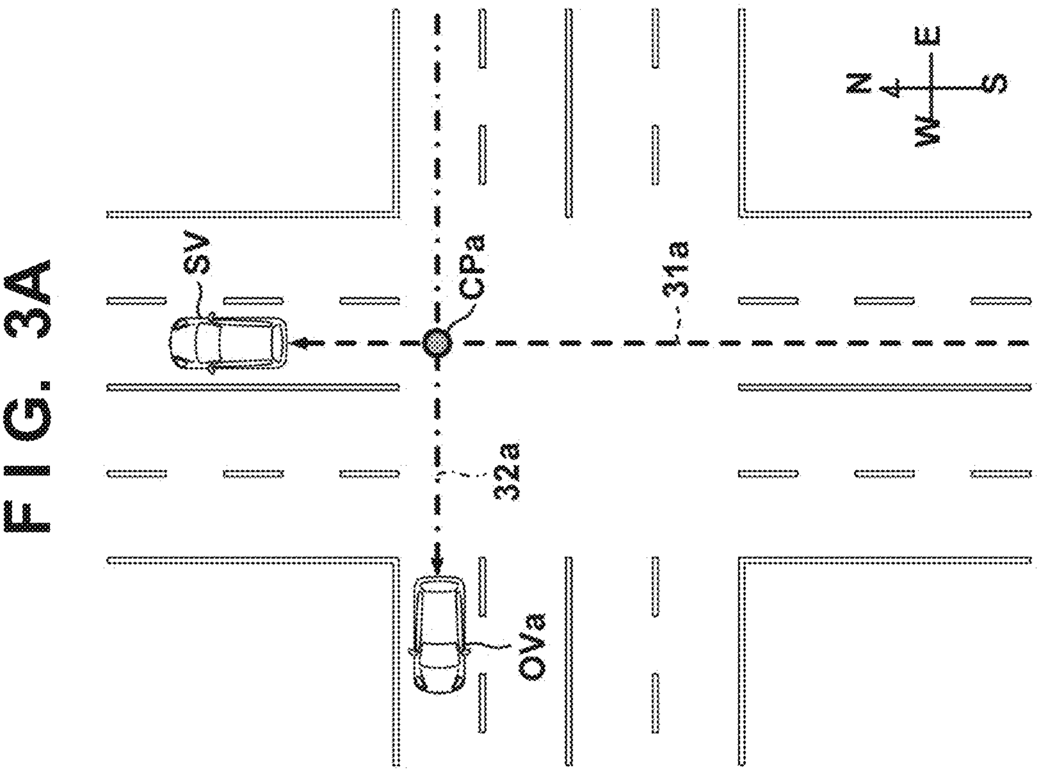

Here, the intersection location will be described with reference to FIGS. 3A and 3B. FIGS. 3A and 3B are diagrams for explaining intersection locations. As described above, the intersection location is a location where the traveling trajectory of the self-vehicle and the traveling trajectory of another vehicle intersected in the past. In the present embodiment, right-side traffic will be described as an example, but the same applies to left-side traffic.

In the example illustrated in FIG. 3A, the location where the traveling trajectory 31*a* of a self-vehicle SV traveling straight in the north direction and the traveling trajectory 32*a* of another vehicle OVa traveling straight in the west direction intersect is specified as an "intersection location CPa" and registered in the intersection location database of the storage unit 22. Since the timing (time) at which the self-vehicle SV passes through the intersection location CPa and the timing (time) at which another vehicle OVa passes through the intersection location CPa are different from each other, no collision occurs between the self-vehicle SV and another vehicle OVa. The traveling trajectory 31*a* of the self-vehicle SV is included in the self-vehicle information acquired by the acquisition unit 21*a* through the sensor group 11 and the GNSS antenna 12 (GNSS module 23). The traveling trajectory 32*a* of another vehicle OVa is included in another vehicle information acquired by the acquisition unit 21*a* through the vehicle-to-vehicle communication antenna 13 (vehicle-to-vehicle communication module 24). Another vehicle information may be understood as surrounding vehicle information since another vehicle OVa is a surrounding vehicle present around the self-vehicle SV at the time of acquisition.

In the example illustrated in FIG. 3B, the location where the traveling trajectory 31*b* of the self-vehicle SV traveling straight in the north direction and turning left and the traveling trajectory 32*b* of another vehicle OVb traveling straight in the south direction intersect is specified as an "intersection location CPb" and registered in the intersection location database of the storage unit 22. Since the timing (time) at which the self-vehicle SV passes through the intersection location CPb and the timing (time) at which another vehicle OVb passes through the intersection location CPb are different from each other, no collision occurs between the self-vehicle SV and another vehicle OVb. Similarly to the traveling trajectory 31*a*, the traveling trajectory 31*b* of the self-vehicle SV is included in the self-vehicle information acquired by the acquisition unit 21*a* through the sensor group 11 and the GNSS antenna 12 (GNSS module 23). Similarly to the traveling trajectory 32*a*, the traveling trajectory 32*b* of another vehicle OVb is included in another vehicle information (surrounding vehicle information) acquired by the acquisition unit 21*a* through the vehicle-to-vehicle communication antenna 13 (vehicle-to-vehicle communication module 24).

In addition, the function of the control device 20 can be implemented by both hardware and software. For example, the function of the control device 20 may be implemented by the processing unit 21 (CPU) executing the driving assistance program and/or the learning program as described above, or may be implemented by a known semiconductor device such as a PLD (Programmable Logic Device) or an ASIC (Application Specific Integrated Circuit). In the present embodiment, the control device 20 is illustrated as a single element, but may be divided into two or more elements as necessary.

Driving Assistance Processing

Figure 4:
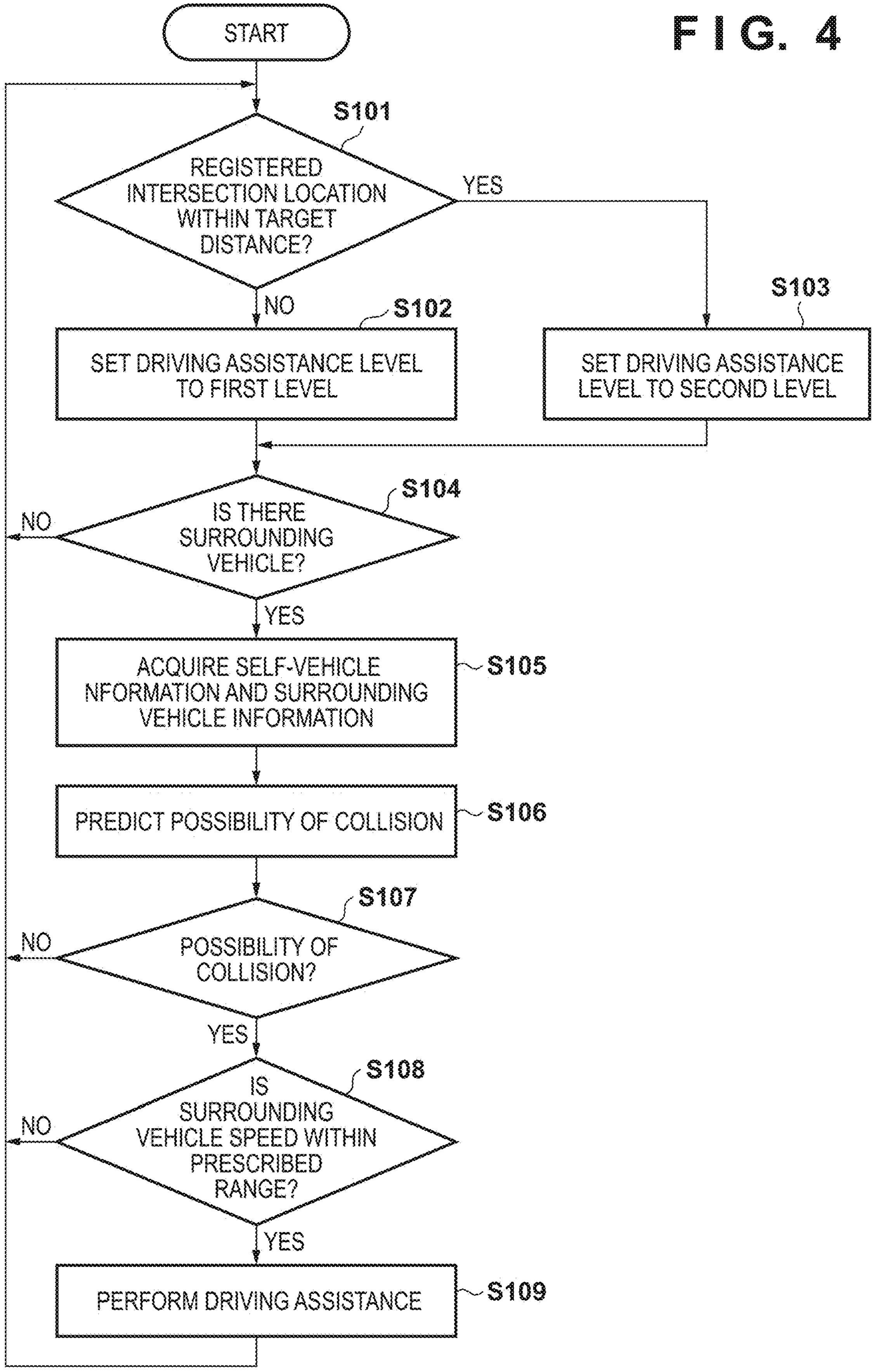
FIG. 4 is a flowchart illustrating driving assistance processing according to an embodiment of the present invention.

Hereinafter, driving assistance processing according to the present embodiment will be described. FIG. 4 is a flowchart illustrating the driving assistance processing according to the present embodiment. The driving assistance processing illustrated in the flowchart of FIG. 4 is executed by the processing unit 21 in accordance with the driving assistance program read from the storage unit 22 in the driving assistance device 100. The flowchart of FIG. 4 can be repeatedly executed, for example, until the setting of driving assistance is turned off or the ignition of the self-vehicle SV is turned off.

Figure 5B:
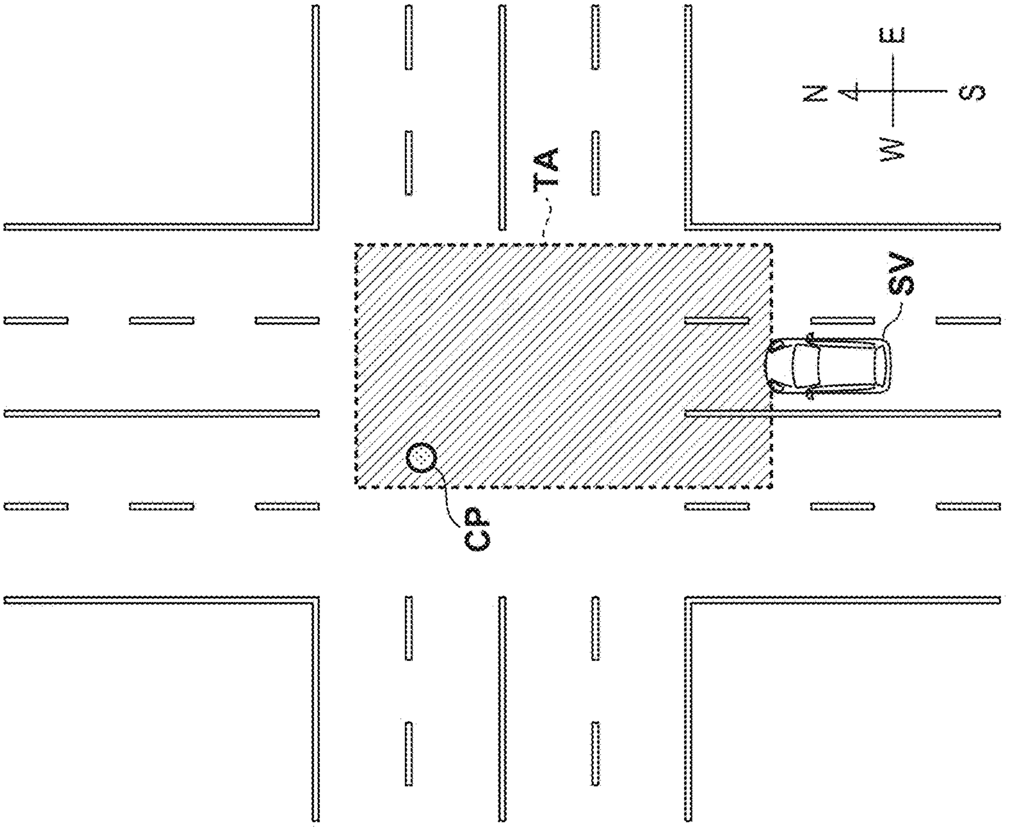
FIGS. 5A and 5B are diagrams for explaining the presence or absence of a registered intersection location in a target area in front of a self-vehicle.
Figure 5A:
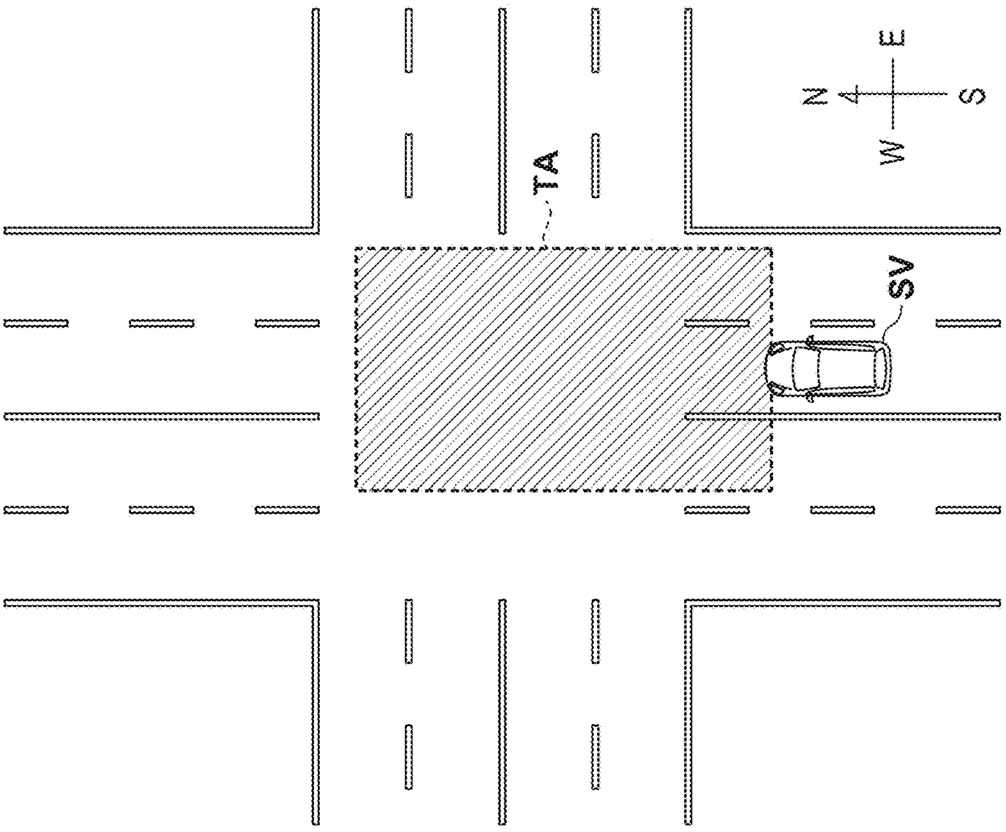

In step S101, the processing unit 21 (driving assistance unit 21*b*) determines whether or not the registered intersection location CP is present in the target area TA in front of the self-vehicle SV by referring to the plurality of registered intersection locations CP stored in the storage unit 22. For example, the processing unit 21 can determine whether or not the registered intersection location CP is present in the target area TA by comparing the current location of the self-vehicle SV acquired by the acquisition unit 21*a* through the GNSS antenna 12 (GNSS module 23) with the coordinates (latitude, longitude) of each registered intersection location CP stored in the storage unit 22. FIG. 5A illustrates an example in which the registered intersection location CP is not present in the target area TA in front of the self-vehicle SV, and FIG. 5B illustrates an example in which the registered intersection location CP is present in the target area TA in front of the self-vehicle SV.

When the registered intersection location CP is not present in the target area TA, the process proceeds to step S102 in which the processing unit 21 (driving assistance unit 21*b*) sets the driving assistance level as the degree of driving assistance to the first level. On the other hand, when the registered intersection location CP is present in the target area TA, the process proceeds to step S103 in which the processing unit 21 (driving assistance unit 21*b*) sets the driving assistance level to the second level. The second level is set such that the degree of driving assistance (driving assistance level) becomes larger than the first level, for example, the operating conditions of the driving assistance are relaxed. In the present embodiment, two types of driving assistance levels of the first level and the second level are exemplified, but the driving assistance levels are not limited to two types, and may be three or more types.

In step S104, the processing unit 21 determines whether or not there is a surrounding vehicle RV. As described above, the surrounding vehicle RV is a vehicle currently present around the self-vehicle SV. For example, the processing unit 21 can determine that the surrounding vehicle RV is present when vehicle-to-vehicle communication can be performed through the vehicle-to-vehicle communication antenna 13 (vehicle-to-vehicle communication module 24). When it is determined that there is no surrounding vehicle RV, the process proceeds to step S101, and when it is determined that there is a surrounding vehicle RV, the process proceeds to step S105.

In step S105, the processing unit 21 (acquisition unit 21*a*) acquires self-vehicle information and surrounding vehicle information. For example, the processing unit 21 acquires surrounding vehicle information including the current location, speed, and traveling trajectory of the surrounding vehicle RV from the surrounding vehicle RV through the vehicle-to-vehicle communication antenna 13 (vehicle-to-vehicle communication module 24). In addition, the processing unit 21 acquires self-vehicle information including the current location, speed, and traveling trajectory of the self-vehicle SV through the sensor group 11 and the GNSS antenna 12 (GNSS module 23).

In step S106, the processing unit 21 (driving assistance unit 21*b*) predicts the possibility of collision between the self-vehicle SV and the surrounding vehicle RV in the target area TA based on the self-vehicle information and the surrounding vehicle information acquired in step S105. Then, in step S107, the processing unit 21 (driving assistance unit 21*b*) determines whether or not there is a possibility of collision between the self-vehicle SV and the surrounding vehicle RV based on the prediction result in step S106. When it is determined that there is no possibility of collision, the process proceeds to step S101, and when it is determined that there is a possibility of collision, the process proceeds to step S108.

In step S108, the processing unit 21 (driving assistance unit 21*c*) determines whether or not the speed of the surrounding vehicle RV is within a prescribed range based on the surrounding vehicle information acquired in step S105. The prescribed range can be set in advance using the speed lower limit value and the speed upper limit value related to the speed of the surrounding vehicle RV. When the speed of the surrounding vehicle RV is equal to or less than the speed lower limit value of the prescribed range, there is a high possibility that the driver of the surrounding vehicle RV notices the self-vehicle SV and decelerates the surrounding vehicle RV without colliding with the self-vehicle SV. That is, the speed lower limit value of the prescribed range related to the speed of the surrounding vehicle RV can be set to a value that allows the surrounding vehicle RV to be decelerated without colliding with the self-vehicle SV. In addition, when the speed of the surrounding vehicle RV is equal to or greater than the upper limit value of the prescribed range, there is a high possibility that the surrounding vehicle RV is not a vehicle traveling on the road the self-vehicle SV enters, such as traveling on an expressway in the vicinity of the road the self-vehicle SV enters. That is, the upper limit value of the prescribed range related to the speed of the surrounding vehicle RV can be set to a value that enables determination of whether or not the vehicle is traveling on the road the self-vehicle SV enters or traveling on an expressway in the vicinity of the road. In this manner, by performing/suppressing the driving assistance according to whether or not the speed of the surrounding vehicle RV is within the prescribed range, it is possible to reduce the driver of the self-vehicle SV from feeling annoyance of the driving assistance.

When it is determined in step S108 that the speed of the surrounding vehicle RV is not within the prescribed range, that is, outside the prescribed range, the process proceeds to step S101. That is, in the case of the present embodiment, regardless of the possibility of collision predicted in steps S106 and S107, the processing unit 21 does not provide driving assistance for the self-vehicle SV when the speed of the surrounding vehicle RV is outside the prescribed range. On the other hand, when it is determined that the speed of the surrounding vehicle RV is within the prescribed range, the process proceeds to step S109, and the processing unit 21 (driving assistance unit 21*c*) performs driving assistance for the self-vehicle SV. As driving assistance for the self-vehicle SV, the processing unit 21 can notify an occupant of the self-vehicle SV of the possibility of collision through the notification device 14 or perform a braking operation on the self-vehicle SV using the braking device 15.

As described above, the driving assistance device 100 according to the present embodiment changes the degree of driving assistance (driving assistance level) of the self-vehicle SV according to whether or not the registered intersection location CP is present in the target area TA in front of the self-vehicle SV. However, if the intersection location is not appropriately specified/registered, for example, if the intersection location is excessively specified/registered for a point at which the necessity of driving assistance is relatively low, or if the intersection location is not specified/registered for a point at which the necessity of driving assistance is relatively high, it may be difficult to appropriately perform driving assistance for the self-vehicle SV based on the plurality of registered intersection locations CP in the intersection location database.

Therefore, the driving assistance device 100 according to the present embodiment determines, as a candidate point, a point at which the acceleration starts after the self-vehicle SV decelerates to the speed threshold value or less or a point at which the self-vehicle SV temporarily stops. Then, when it is determined that the surrounding vehicle RV has passed through a predetermined area (passage determination area) set for the candidate point based on the surrounding vehicle information, the driving assistance device 100 specifies a location where the traveling trajectory of the self-vehicle SV and the traveling trajectory of the surrounding vehicle RV intersect as a new intersection location. That is, the driving assistance device 100 specifies a new intersection location with the fact that the surrounding vehicle RV passes through the predetermined area set for the candidate point as a trigger. In addition, when the new intersection location is specified, the driving assistance device 100 registers the new intersection location in the storage unit 22 (intersection location database).

Learning Processing of New Intersection Location

Figure 6:
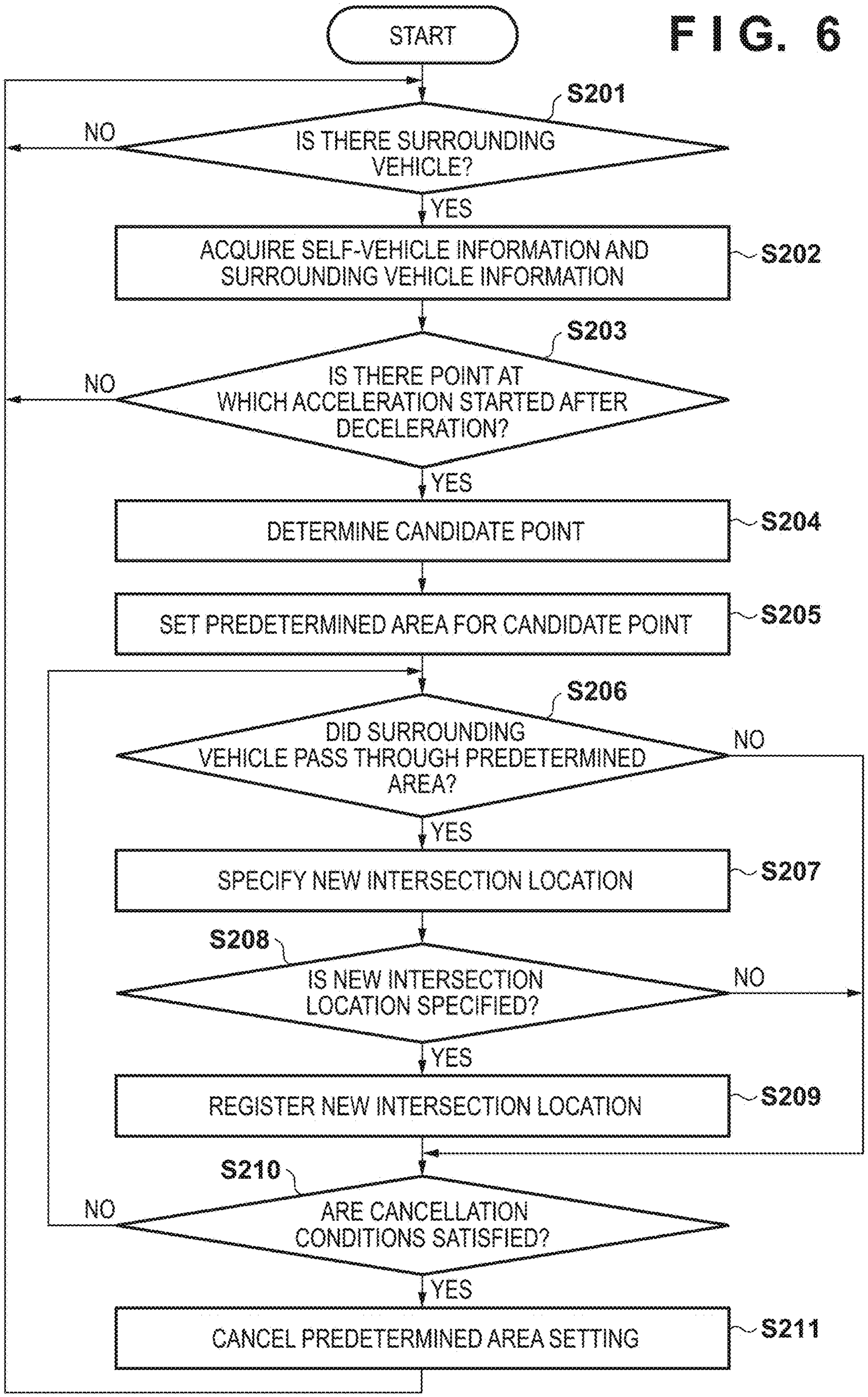
FIG. 6 is a flowchart illustrating learning processing according to an embodiment of the present invention.

Hereinafter, learning processing of a new intersection location in the present embodiment will be described. The learning processing of the new intersection location may be understood as processing for specifying the new intersection location and registering the specified new intersection location in the intersection location database. FIG. 6 is a flowchart illustrating learning processing of a new intersection location in the present embodiment. The learning processing illustrated in the flowchart of FIG. 6 is performed by the processing unit 21 in parallel with the flowchart of FIG. 4 according to the learning program read from the storage unit 22. The flowchart of FIG. 6 can be repeatedly executed until the ignition of the self-vehicle SV is turned off, for example. In addition, FIGS. 7A to 11B are diagrams for explaining the steps of the flowchart of FIG. 6, and A and B of the diagrams illustrate examples of different situations.

In step S201, the processing unit 21 determines whether or not there is a surrounding vehicle RV. For example, similarly to step S104 of the flowchart of FIG. 4, the processing unit 21 can determine that the surrounding vehicle RV is present when vehicle-to-vehicle communication can be performed through the vehicle-to-vehicle communication antenna 13 (vehicle-to-vehicle communication module 24). When it is determined that there is no surrounding vehicle RV, step S201 is repeated, and when it is determined that there is a surrounding vehicle RV, the process proceeds to step S202.

Figure 7B:
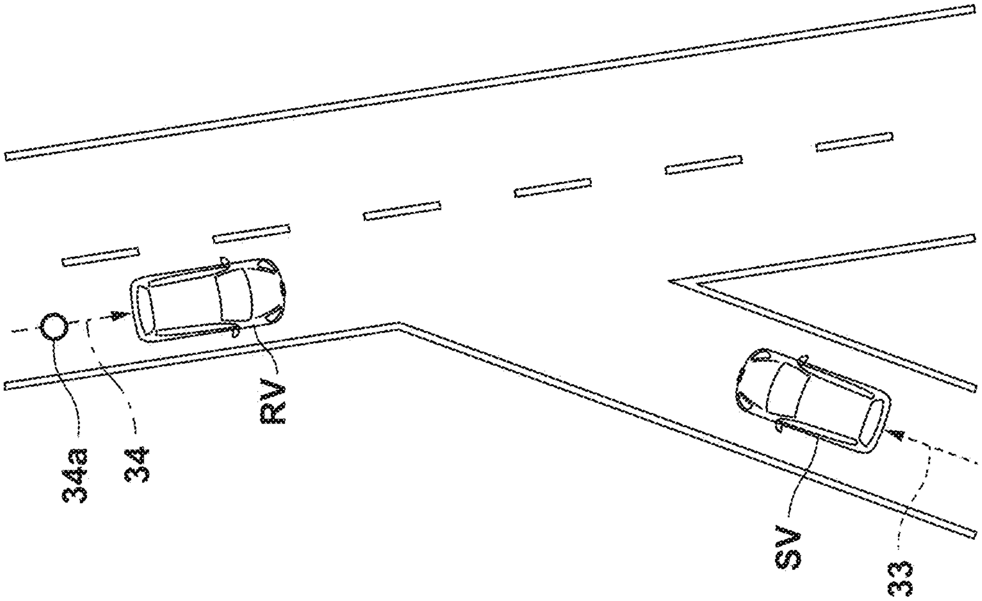
FIGS. 7A and 7B are diagrams for explaining a step (S202) of the flowchart of FIG. 6.
Figure 7A:
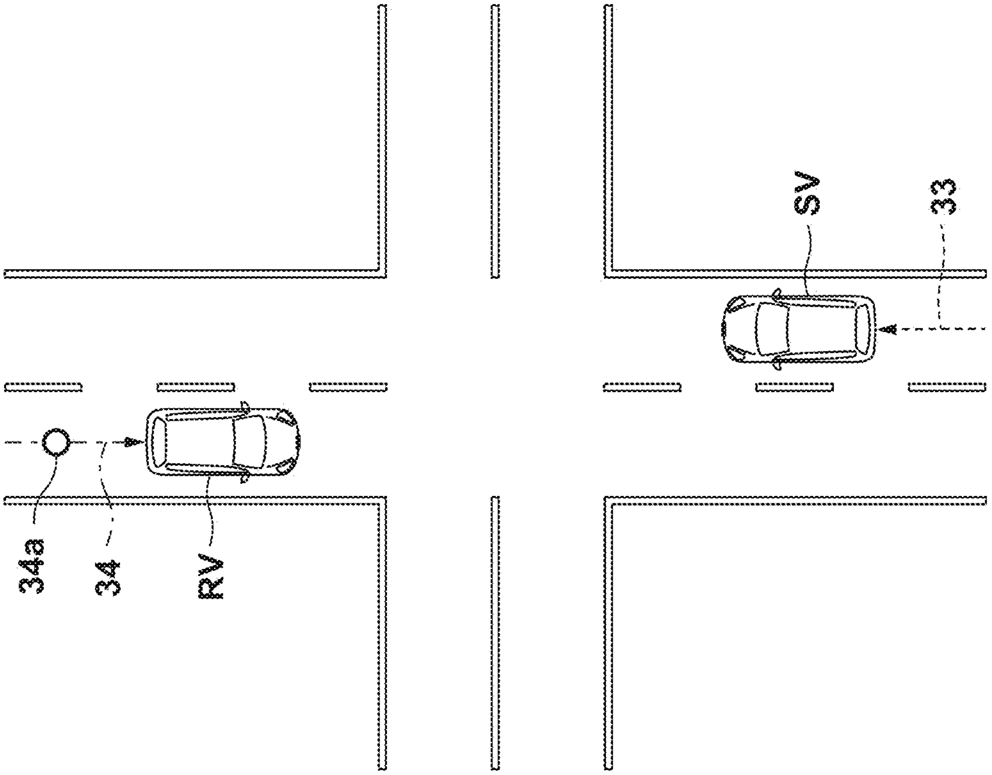

In step S202, the processing unit 21 (acquisition unit 21*a*) acquires self-vehicle information and surrounding vehicle information. FIGS. 7A and 7B are diagrams for explaining this step S202. The self-vehicle information includes a traveling trajectory 33 of the self-vehicle SV in addition to the current location and speed of the self-vehicle SV. In addition, the surrounding vehicle information includes a traveling trajectory 34 of the surrounding vehicle RV in addition to the current location and speed of the surrounding vehicle RV. Here, as illustrated in FIGS. 7A and 7B, the traveling trajectory 34 of the surrounding vehicle RV is configured by a data sequence of a plurality of passing points 34*a* through which the surrounding vehicle RV has passed, that is, a data sequence of the current location included in the surrounding vehicle information acquired so far. The plurality of passing points 34*a* may be referred to as a passing history (pass history) regarding the surrounding vehicle RV. In the flowchart of FIG. 6, the self-vehicle information and the surrounding vehicle information are acquired only in step S202, but the present invention is not limited thereto, and the self-vehicle information and the surrounding vehicle information can be sequentially (periodically) acquired during the execution of the flowchart of FIG. 6.

Figure 8B:
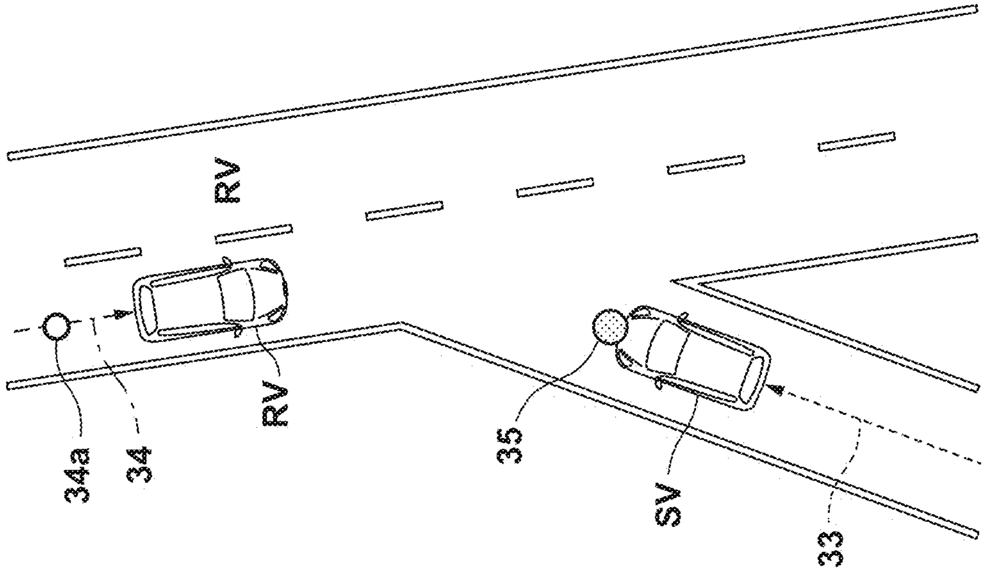
FIGS. 8A and 8B are diagrams for explaining a step (S204) of the flowchart of FIG. 6.
Figure 8A:
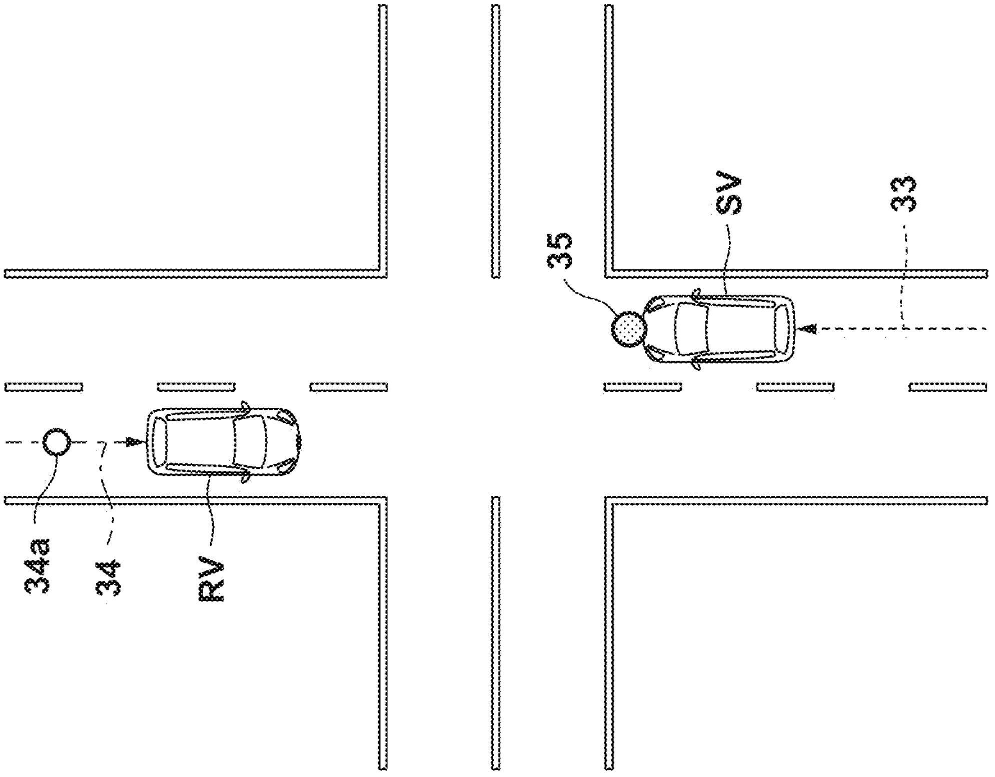

In step S203, the processing unit 21 (determination unit 21*c*) determines whether or not there is a point at which the self-vehicle SV starts to accelerate after decelerating to the speed threshold value or less (including a point at which the self-vehicle SV temporarily stops) based on the self-vehicle information acquired in step S202. As described above, the speed threshold value is used to detect that the self-vehicle SV temporarily decelerates to check for safety in the surrounding area, and may be set to 20 km/h as an example. When there is no point at which the acceleration is started after the self-vehicle SV decelerates to the speed threshold value or less, the process proceeds to step S201. On the other hand, when there is a point at which the self-vehicle SV starts to accelerate after decelerating to the speed threshold value or less, the process proceeds to step S204 in which the processing unit 21 (determination unit 21*c*) determines the point as the candidate point 35 at which the location where the self-vehicle SV and the surrounding vehicle RV intersect is specified. FIGS. 8A and 8B are diagrams for explaining this step S204.

Figure 9A:
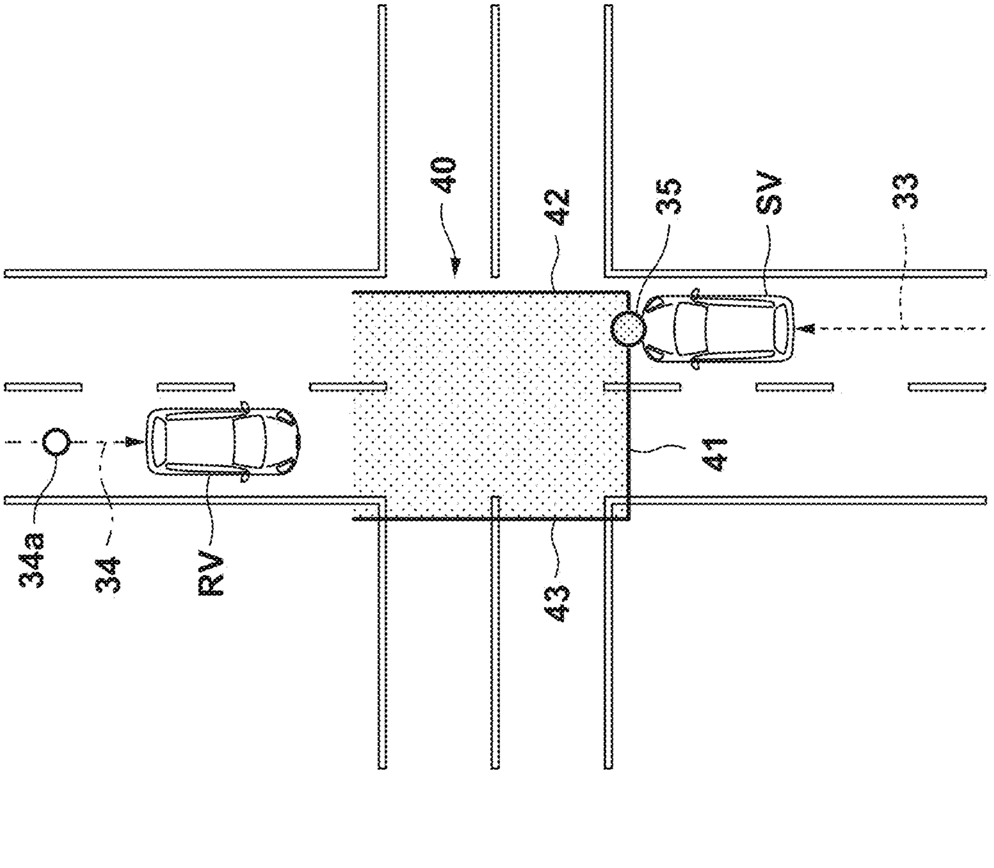
FIGS. 9A and 9B are diagrams for explaining a step (S205) of the flowchart of FIG. 6.
Figure 9B:
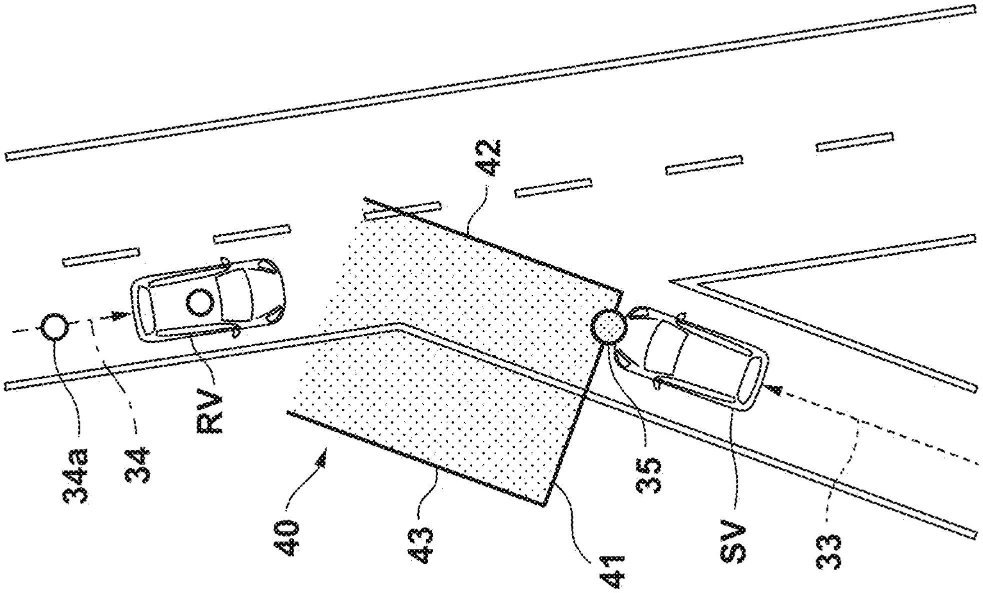

In step S205, the processing unit 21 (specifying unit 21*d*) sets a predetermined area 40 for the candidate point 35 determined in step S204. FIGS. 9A and 9B are diagrams for explaining this step S205. As described above, the predetermined area 40 is an area (passage determination area) that is set to determine passage of the surrounding vehicle RV with specifying a new intersection location as a trigger. In the case of the present embodiment, the predetermined area 40 is defined as a quadrangular (U-shaped) area whose three sides are a first virtual line 41, a second virtual line 42 connected to one end point of the first virtual line 41, and a third virtual line 43 connected to the other end point of the first virtual line 41 and whose remaining one side is open. For example, when it is determined that the surrounding vehicle RV is present in front of the self-vehicle SV based on the surrounding vehicle information acquired in step S202, the processing unit 21 sets the predetermined area 40, which is open in a direction (forward) in which the surrounding vehicle RV is present, by setting a line that includes the candidate point 35 and extends in the vehicle width direction of the self-vehicle SV as the first virtual line 41 as illustrated in FIGS. 9A and 9B. In this case, each of the second virtual line 42 and the third virtual line 43 may be defined as a line extending forward of the self-vehicle SV.

Figure 12B:
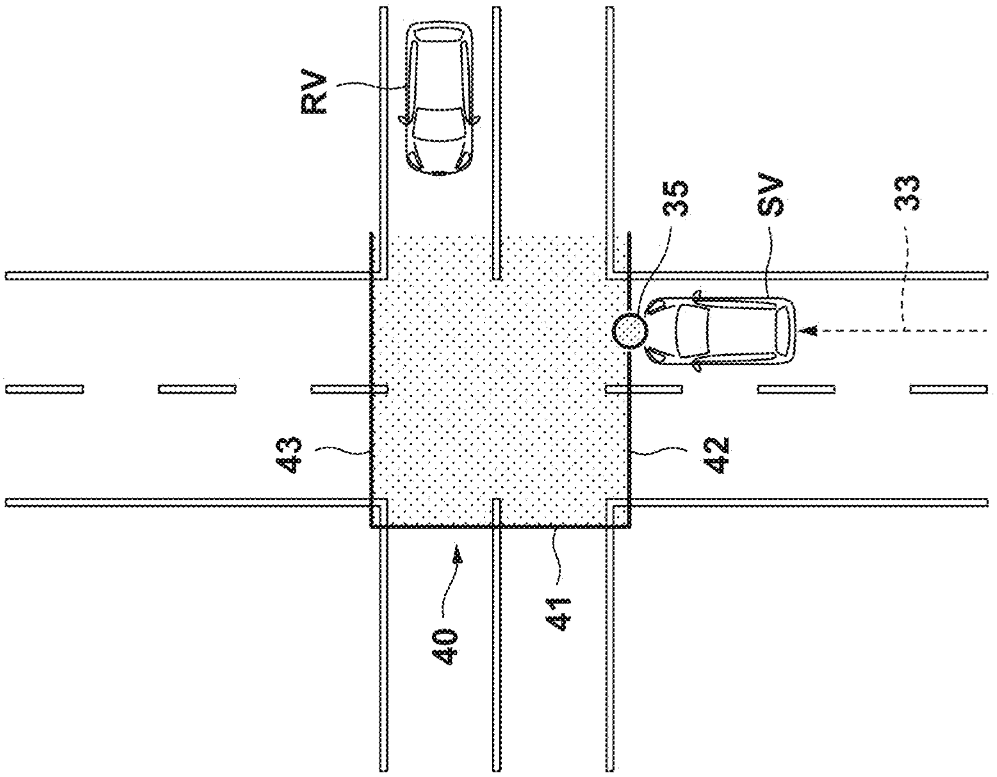
FIGS. 12A and 12B are diagrams for explaining another example of the setting of a predetermined area (S205).
Figure 12A:
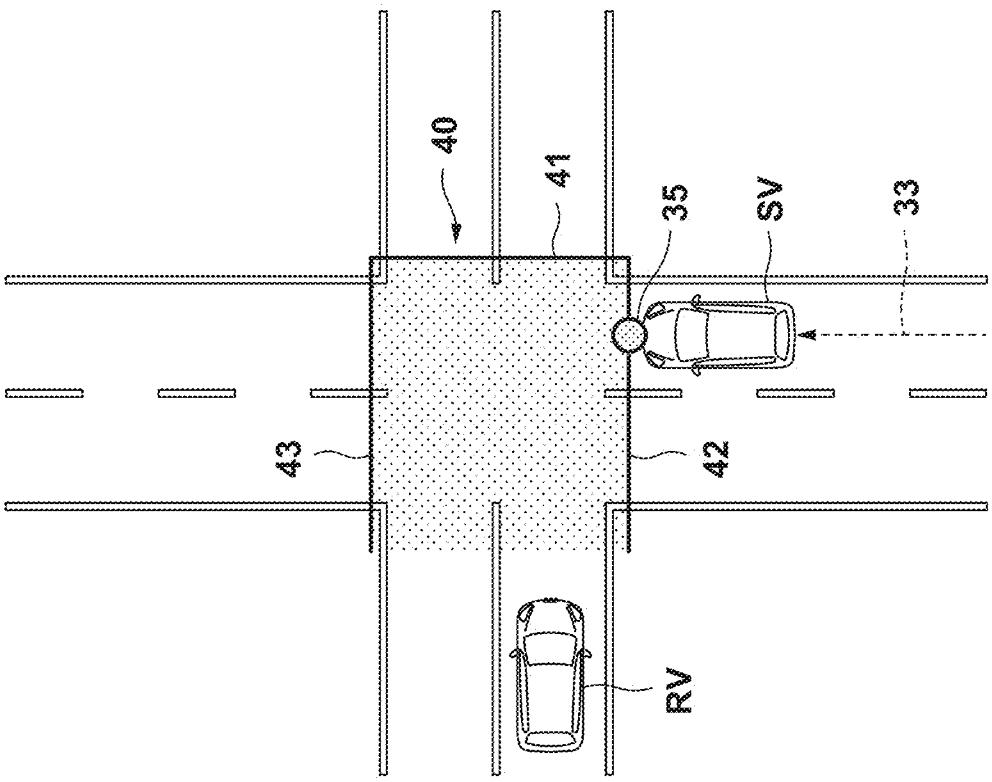

On the other hand, when it is determined that the surrounding vehicle RV is present in the left direction of the self-vehicle SV based on the surrounding vehicle information acquired in step S202, the processing unit 21 sets the predetermined area 40, which is open in a direction (left direction) in which the surrounding vehicle RV is present, by setting a line that includes the candidate point 35 and extends in the vehicle width direction of the self-vehicle SV as the second virtual line 42 as illustrated in FIG. 12A. In addition, when it is determined that the surrounding vehicle RV is present in the right direction of the self-vehicle SV based on the surrounding vehicle information acquired in step S202, the processing unit 21 sets the predetermined area 40, which is open in a direction (right direction) in which the surrounding vehicle RV is present, by setting a line that includes the candidate point 35 and extends in the vehicle width direction of the self-vehicle SV as the second virtual line 42 as illustrated in FIG. 12B.

Here, the processing unit 21 may set the predetermined area 40 such that the second virtual line 42 and the third virtual line 43 are parallel to each other. For example, the processing unit 21 may set, as the predetermined area 40, a rectangular area having the first virtual line 41, the second virtual line 42, and the third virtual line 43 as three sides. In addition, the processing unit 21 may set the predetermined area 40 such that the length of the second virtual line 42 and the length of the third virtual line 43 are equal to or greater than the length of the first virtual line 41. For example, when it is determined that the surrounding vehicle RV is present in front of the self-vehicle SV, the processing unit 21 can set a rectangular area longer in the front-and-rear direction than in the vehicle width direction of the self-vehicle SV as the predetermined area 40. On the other hand, when it is determined that the surrounding vehicle RV is present in the left direction or the right direction of the self-vehicle SV, the processing unit 21 can set a rectangular area longer in the vehicle width direction than in the front-and-rear direction of the self-vehicle SV as the predetermined area 40.

Figure 10A:
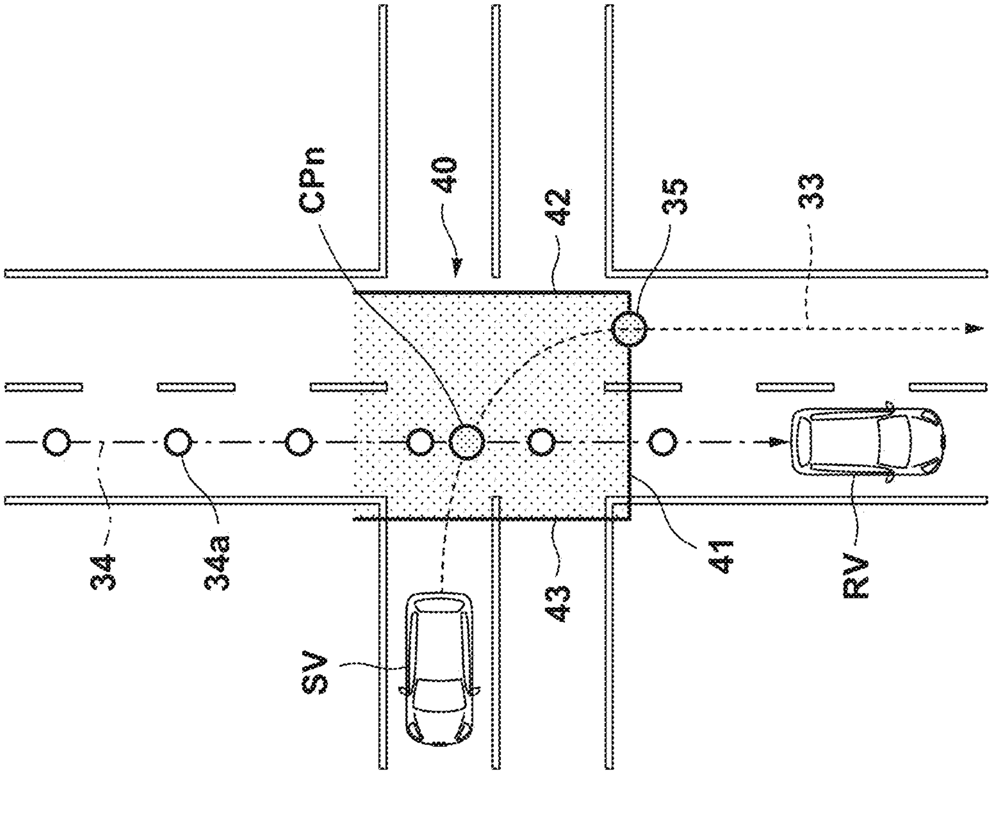
FIGS. 10A and 10B are diagrams for explaining steps (S206 and S207) of the flowchart of FIG. 6.
Figure 10B:
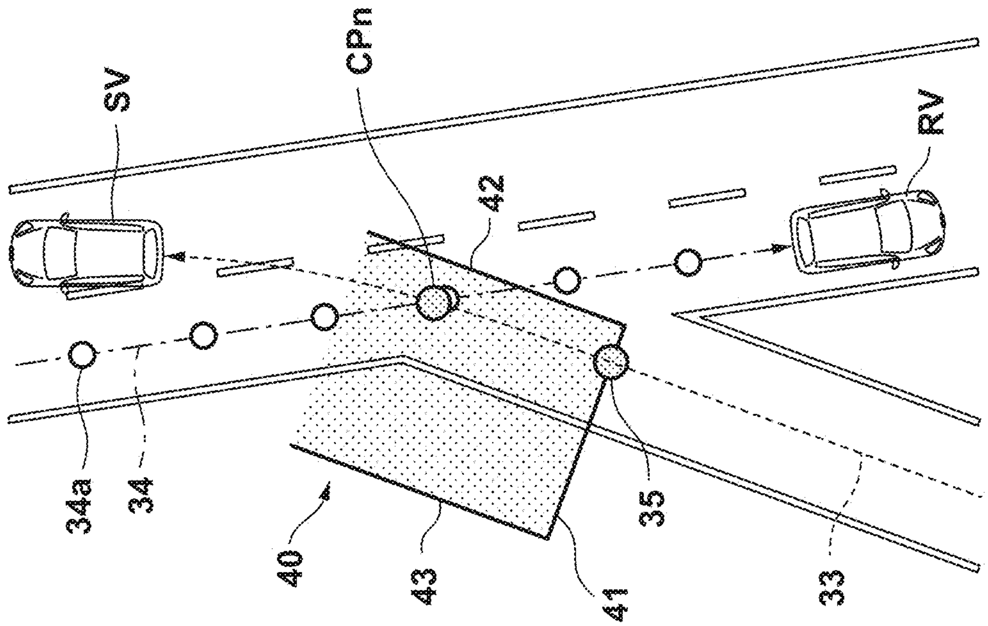

In step S206, the processing unit 21 (specifying unit 21*d*) determines whether or not the surrounding vehicle RV has passed through the predetermined area 40 set in step S205 based on the surrounding vehicle information acquired in step S202. For example, as illustrated in FIGS. 10A and 10B, the processing unit 21 can determine that the surrounding vehicle RV has passed through the predetermined area 40, based on the traveling trajectory 34 of the surrounding vehicle RV included in the surrounding vehicle information, when the surrounding vehicle RV has crossed any one of the first virtual line 41, the second virtual line 42, and the third virtual line 43 from the inside to the outside of the predetermined area 40. That is, the processing unit 21 can determine that the surrounding vehicle RV has passed through the predetermined area 40 when the traveling trajectory 34 of the surrounding vehicle RV intersects any one of the first virtual line 41, the second virtual line 42, and the third virtual line 43. When it is determined that the surrounding vehicle RV has passed through the predetermined area 40, the process proceeds to step S207, and when it is determined that the surrounding vehicle RV has not passed through the predetermined area 40, the process proceeds to step S210.

In step S206, the processing unit 21 (specifying unit 21*d*) may determine whether or not the self-vehicle SV has also passed through the predetermined area 40 based on the self-vehicle information acquired in step S202. That is, the processing unit 21 may determine whether or not both the self-vehicle SV and the surrounding vehicle RV have passed through the predetermined area 40. In this case, when it is determined that both the self-vehicle SV and the surrounding vehicle RV have passed through the predetermined area 40, the process proceeds to step S207, and when it is determined that the self-vehicle SV or the surrounding vehicle RV has not passed through the predetermined area 40, the process proceeds to step S210.

In step S207, if there is a location where the traveling trajectory 33 of the self-vehicle SV and the traveling trajectory 34 of the surrounding vehicle RV intersect, the processing unit 21 (specifying unit 21*d*) specifies the location as the new intersection location CPn, as illustrated in FIGS. 10A and 10B, based on the self-vehicle information and the surrounding vehicle information acquired in step S202. Then, in step S208, the processing unit 21 (specifying unit 21*d*) determines whether or not the new intersection location CPn has been specified in step S207. When the new intersection location CPn is specified, the process proceeds to step S209, and when the new intersection location CPn is not specified, the process proceeds to step S210.

Here, depending on the traffic situation, it is assumed that a plurality of surrounding vehicles RV pass through the predetermined area 40 set in step S205. In this case, for each of the plurality of surrounding vehicles RV, a location where the traveling trajectory 33 of the self-vehicle SV and the traveling trajectory 34 of the surrounding vehicle RV intersect is specified. That is, a plurality of intersection locations are specified. Therefore, when it is determined that the plurality of surrounding vehicles RV have passed through the predetermined area 40, the processing unit 21 (specifying unit 21*d*) may specify the representative value of the location where the traveling trajectory 33 of the self-vehicle SV and the traveling trajectory 34 of each of the plurality of surrounding vehicles RV intersect, that is, the representative value of the plurality of intersection locations as the new intersection location CPn. Examples of the representative value include an average value, a median value, and a mode value.

Figure 11A:
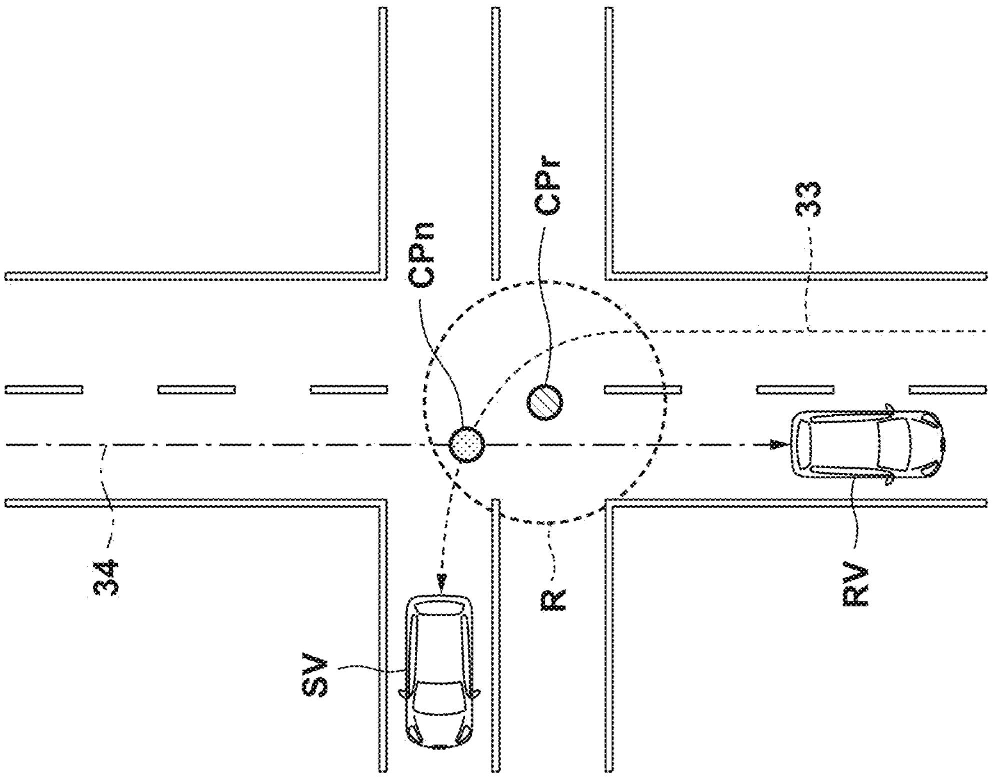
FIGS. 11A and 11B are diagrams for explaining a step (S209) of the flowchart of FIG. 6.
Figure 11B:
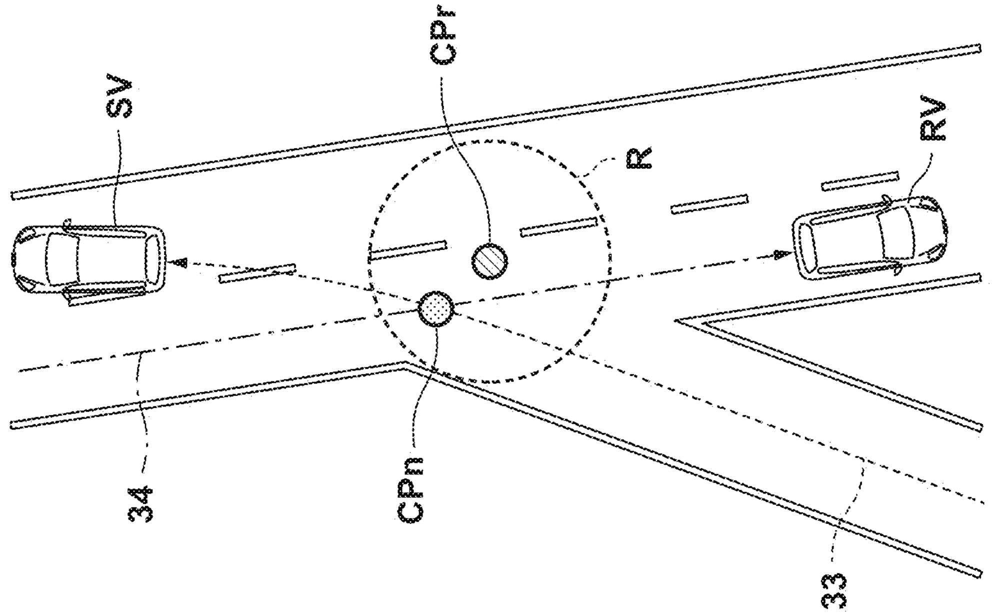

In step S209, the processing unit 21 (registration unit 21*e*) registers the new intersection location CPn specified in step S207 in the intersection location database (storage unit 22). For example, the processing unit 21 can register the new intersection location CPn in the intersection location database by adding the new intersection location CPn specified in step S207 to the intersection location database. In addition, the processing unit 21 may register the new intersection location CPn in the intersection location database by correcting the intersection location database with the new intersection location CPn specified in step S207. For example, as illustrated in FIGS. 11A and 11B, when the new intersection location CPn is specified within a predetermined range R from at least one intersection location CPr among a plurality of registered intersection locations CP in the intersection location database, the processing unit 21 can register the new intersection location CPn in the intersection location database by correcting the at least one intersection location CPr with the new intersection location CPn.

Examples of the correction method include a method of calculating a representative value of the at least one intersection location CPr and the new intersection location CPn and registering the calculated representative value as the at least one intersection location CPr. In FIGS. 11A and 11B, only one intersection location CPr is illustrated. Examples of the representative value include an average value, a median value, and a mode value.

Here, in step S209, the processing unit 21 (registration unit 21*e*) may register the traveling trajectory 34 (data string of the plurality of passing points 34*a*) of the surrounding vehicle RV until reaching the new intersection location CPn, in the intersection location database, together with the new intersection location CPn in association with the new intersection location CPn based on the surrounding vehicle information. In addition, the processing unit 21 may register the traveling direction (passing azimuth, entry direction) of the self-vehicle SV when entering the new intersection location CPn, in the intersection location database, together with the new intersection location CPn in association with the new intersection location CPn based on the self-vehicle information. The processing unit 21 may register the traveling direction (passing azimuth, entry direction) of the surrounding vehicle RV when entering the new intersection location CPn, in the intersection location database, together with the new intersection location CPn in association with the new intersection location CPn based on the surrounding vehicle information.

In step S210, the processing unit 21 (specifying unit 21*d*) determines whether or not cancellation conditions for canceling the setting of the predetermined area 40 for the candidate point 35 determined in step S204 are satisfied. In the case of the present embodiment, in order to reduce the calculation load of the processing unit 21, the predetermined area 40 that can be set is limited to a prescribed number (for example, one). That is, when a predetermined number of predetermined areas 40 are already set, the processing unit 21 (specifying unit 21*d*) does not set the new predetermined area 40. Therefore, in this step S210, it is determined whether or not the cancellation conditions for canceling the setting of the predetermined area 40 are satisfied. The cancellation conditions may include at least one of a condition that the new intersection location CPn is registered in the intersection location database, a condition that the self-vehicle SV has traveled a prescribed distance from the candidate point 35, and a condition that an elapsed time after the predetermined area 40 is set exceeds a time threshold value. When it is determined that the cancellation conditions are not satisfied, the process proceeds to step S206, and when it is determined that the cancellation conditions are satisfied, the process proceeds to step S211. In step S211, the processing unit 21 (specifying unit 21*d*) cancels the setting of the predetermined area 40.

As described above, the driving assistance device 100 according to the present embodiment determines, as the candidate point 35, a point at which the acceleration starts after the self-vehicle SV decelerates to the speed threshold value or less, and specifies, as the new intersection location CPn, a location where the traveling trajectory 33 of the self-vehicle SV and the traveling trajectory 34 of the surrounding vehicle RV intersect when it is determined that the surrounding vehicle RV has passed through the predetermined area 40 set for the candidate point 35. As a result, since the intersection location can be appropriately specified (learned), driving assistance for the self-vehicle SV can be appropriately performed.

Other Embodiments

In the above embodiment, in step S205 of the flowchart of FIG. 6, an example in which a quadrangular (U-shaped) area with one side opened is set as the predetermined area 40 has been described, but the present invention is not limited thereto. For example, the processing unit 21 may set, as the predetermined area 40, a quadrangular area in which none of the four sides is open, that is, closed by the four sides. In this case, in step S205, the processing unit 21 sets, as the predetermined area 40, a quadrangular (preferably, rectangular) area including the candidate point 35 and having a virtual line extending in the vehicle width direction of the self-vehicle SV as one side. As an example, in FIGS. 9A and 9B, the first virtual line 41, the second virtual line 42, and the third virtual line 43 are defined, but in addition to these, a fourth virtual line connecting an end point of the second virtual line and an end point of the third virtual line is defined, and a quadrangular area having the first to fourth virtual lines as four sides is set as the predetermined area 40. Then, in step S206, when the surrounding vehicle RV crosses any one of the four sides of the predetermined area 40 from the inside to the outside of the predetermined area 40, the processing unit 21 can determine that the surrounding vehicle RV has passed through the predetermined area 40.

Summary of Embodiments

1. A driving assistance device of the above-described embodiments is a driving assistance device (e.g. 100) that includes a storage unit (e.g. 22) configured to store a plurality of intersection locations (e.g. CP) each indicating a location where a traveling trajectory of a self-vehicle (e.g. SV) and a traveling trajectory of another vehicle (e.g. OV) intersect in a past and performs driving assistance for the self-vehicle based on each of the plurality of intersection locations, the device comprising:

- an acquisition unit (e.g. 21*a*) configured to acquire surrounding vehicle information including a traveling trajectory of a surrounding vehicle (e.g. RV) present around the self-vehicle, from the surrounding vehicle, through vehicle-to-vehicle communication;
- a determination unit (e.g. 21*c*) configured to determine, as a candidate point (e.g. 35) for specifying a location where the self-vehicle and the surrounding vehicle intersect, a point at which the self-vehicle starts to accelerate after decelerating to a speed threshold value or less or a point at which the self-vehicle temporarily stops;
- a specifying unit (e.g. 21*d*) configured to specify, as a new intersection location (e.g. CPn), a location where the traveling trajectory (e.g. 33) of the self-vehicle and the traveling trajectory (e.g. 34) of the surrounding vehicle intersect in a case of determining that the surrounding vehicle has passed through a predetermined area (e.g.

40) set for the candidate point based on the surrounding vehicle information acquired by the acquisition unit; and a registration unit (e.g. 21*e*) configured to register, in the storage unit, the new intersection location is specified by the specifying unit.

According to this embodiment, a point at which an intersection location between the traveling trajectory of the self-vehicle and the traveling trajectory of the surrounding vehicle is to be specified (learned) is determined as a candidate point, and the intersection location is specified (learned) when the surrounding vehicle passes through a predetermined area set for the candidate point as a trigger. That is, since the intersection location can be appropriately specified (learned), driving assistance for the self-vehicle can be appropriately performed.

2. In the above-described embodiments, the predetermined area is a quadrangular area whose three sides are a first virtual line (e.g. 41), a second virtual line (e.g. 42) connected to one end point of the first virtual line, and a third virtual line (e.g. 43) connected to the other end point of the first virtual line and whose remaining one side is open, in a case of determining that the surrounding vehicle is present in front of the self-vehicle based on the surrounding vehicle information, the specifying unit sets the predetermined area opened in a direction in which the surrounding vehicle is present by setting a line including the candidate point and extending in a vehicle width direction of the self-vehicle as the first virtual line, and in a case where the surrounding vehicle crosses any one of the first virtual line, the second virtual line, and the third virtual line from inside to outside of the predetermined area, the specifying unit determines that the surrounding vehicle has passed through the predetermined area.

According to this embodiment, with the specification (learning) of the intersection location as a trigger, it is possible to accurately determine whether or not the surrounding vehicle has passed through the predetermined area. Therefore, since excessive specification (excessive learning) of the intersection location or non-specification (non-learning) of the intersection location is reduced, it is possible to appropriately specify the intersection location.

3. In the above-described embodiments, the predetermined area is a quadrangular area whose three sides are a first virtual line (e.g. 41), a second virtual line (e.g. 42) connected to one end point of the first virtual line, and a third virtual line (e.g. 43) connected to the other end point of the first virtual line and whose remaining one side is open, in a case of determining that the surrounding vehicle is present in a left or right direction of the self-vehicle based on the surrounding vehicle information, the specifying unit sets the predetermined area opened in a direction in which the surrounding vehicle is present by setting a line including the candidate point and extending in a vehicle width direction of the self-vehicle as the second virtual line, and in a case where the surrounding vehicle crosses any one of the first virtual line, the second virtual line, and the third virtual line from inside to outside of the predetermined area, the specifying unit determines that the surrounding vehicle has passed through the predetermined area.

According to this embodiment, with the specification (learning) of the intersection location as a trigger, it is possible to accurately determine whether or not the surrounding vehicle has passed through the predetermined area. Therefore, since excessive specification (excessive learning) of the intersection location or non-specification (non-learning) of the intersection location is reduced, it is possible to appropriately specify the intersection location.

4. In the above-described embodiments, the specifying unit sets, as the predetermined area, a quadrangular area including the candidate point and having a virtual line extending in a vehicle width direction of the self-vehicle as one side, and in a case where the surrounding vehicle crosses any one of four sides of the predetermined area from inside to outside of the predetermined area, the specifying unit determines that the surrounding vehicle has passed through the predetermined area.

According to this embodiment, with the specification (learning) of the intersection location as a trigger, it is possible to accurately determine whether or not the surrounding vehicle has passed through the predetermined area. Therefore, since excessive specification (excessive learning) of the intersection location or non-specification (non-learning) of the intersection location is reduced, it is possible to appropriately specify the intersection location.

5. In the above-described embodiments, the specifying unit sets the predetermined area such that a length of the second virtual line and a length of the third virtual line are equal to or greater than a length of the first virtual line.

According to this embodiment, the predetermined area can be appropriately set.

6. In the above-described embodiments, the specifying unit cancels the setting of the predetermined area for the candidate point in a case where the new intersection location is registered in the storage unit by the registration unit or in a case where the self-vehicle travels a prescribed distance from the candidate point.

According to this embodiment, by canceling the setting of the used predetermined area, it is possible to reduce the calculation load related to the specification (learning) of the intersection location.

7. In the above-described embodiments, the specifying unit does not set a new predetermined area in a case where a prescribed number of the predetermined areas are already set.

According to this embodiment, by limiting the number of predetermined areas that can be set to a prescribed number, it is possible to reduce the calculation load related to the specification (learning) of the intersection location.

8. In the above-described embodiments, the registration unit registers a traveling trajectory of the surrounding vehicle until reaching the new intersection location, in the storage unit, in association with the new intersection location based on the surrounding vehicle information.

According to this embodiment, it is possible to use the traveling trajectory of the surrounding vehicle in driving assistance for the self-vehicle executed later based on the new intersection location registered in the intersection location database.

9. In the above-described embodiments, the registration unit registers an azimuth in which the self-vehicle faces when entering the new intersection location, in the storage unit, in association with the new intersection location based on the traveling trajectory of the self-vehicle.

According to this embodiment, since the azimuth (approach azimuth) in which the self-vehicle faces when entering the new intersection location can be registered in the intersection location database together with the new intersection location as a registration item, it is possible to appropriately use the intersection location corresponding to the approach azimuth (travel azimuth) of the self-vehicle in driving assistance for the self-vehicle.

10. In the above-described embodiments, in a case where the new intersection location is specified within a predetermined range (e.g. R) from at least one (e.g. CPr) of the plurality of intersection locations stored in the storage unit, the registration unit registers the new intersection location in the storage unit by correcting the at least one intersection location with the new intersection location.

According to this embodiment, when there is a registered intersection location present in the vicinity of the new intersection location among a plurality of registered intersection locations in the intersection location database, it is avoided that the new intersection location is registered separately from the registered intersection location. Therefore, the intersection location database can be appropriately updated so that the data amount of the intersection location database is reduced.

11. In the above-described embodiments, in a case of determining that a plurality of the surrounding vehicles have passed through the predetermined area, the specifying unit specifies, as the new intersection location, a representative value of a location where a traveling trajectory of each of the plurality of the surrounding vehicles and the traveling trajectory of the self-vehicle intersect.

According to this embodiment, since it is avoided that the new intersection location is registered in the intersection location database for each surrounding vehicle that has passed through the same predetermined area, the intersection location database can be appropriately updated so that the data amount of the intersection location database is reduced.

The invention is not limited to the foregoing embodiments, and various variations/changes are possible within the spirit of the invention.

What is claimed is:

1. A driving assistance device comprising:

a storage configured to store a plurality of intersection locations each indicating a location where a traveling trajectory of a self-vehicle and a traveling trajectory of another vehicle intersect in a past; and a controller configured to control driving assistance for the self-vehicle based on each of the plurality of intersection locations, wherein the controller is configured to:

acquire surrounding vehicle information including a traveling trajectory of a surrounding vehicle present around the self-vehicle, from the surrounding vehicle, through vehicle-to-vehicle communication;

determine, as a candidate point for specifying a location where the self-vehicle and the surrounding vehicle intersect, a point at which the self-vehicle starts to accelerate after decelerating to a speed threshold value or less or a point at which the self-vehicle temporarily stops;

specify, as a new intersection location, a location where the traveling trajectory of the self-vehicle and the traveling trajectory of the surrounding vehicle intersect in a case of determining that the surrounding vehicle has passed through a predetermined area set for the candidate point based on the acquired surrounding vehicle information; and register the specified new intersection location in the storage, wherein the predetermined area is a quadrangular area with three sides comprising a first virtual line, a second virtual line connected to one end point of the first virtual line, and a third virtual line connected to the other end point of the first virtual line and whose remaining one side is open, and wherein the controller is configured to in a case of determining that the surrounding vehicle is present in front of the self-vehicle based on the surrounding vehicle information, set the predetermined area opened in a direction in which the surrounding vehicle is present by setting a line including the candidate point and extending in a vehicle width direction of the self-vehicle as the first virtual line, and in a case where the surrounding vehicle crosses any one of the first virtual line, the second virtual line, and the third virtual line from inside to outside of the predetermined area, determine that the surrounding vehicle has passed through the predetermined area.

2. The driving assistance device according to claim 1, wherein the controller is configured to:

set, as the predetermined area, a quadrangular area including the candidate point and having a virtual line extending in a vehicle width direction of the self-vehicle as one side, and in a case where the surrounding vehicle crosses any one of four sides of the predetermined area from inside to outside of the predetermined area, determine that the surrounding vehicle has passed through the predetermined area.

3. The driving assistance device according to claim 1, wherein the controller is configured to set the predetermined area such that a length of the second virtual line and a length of the third virtual line are equal to or greater than a length of the first virtual line.

4. The driving assistance device according to claim 1, wherein the controller is configured to cancel the setting of the predetermined area for the candidate point in a case where the new intersection location is registered in the storage or in a case where the self-vehicle travels a prescribed distance from the candidate point.

5. The driving assistance device according to claim 1, wherein the controller is configured not to set a new predetermined area in a case where a prescribed number of the predetermined areas are already set.

6. The driving assistance device according to claim 1, wherein the controller is configured to register a traveling trajectory of the surrounding vehicle until reaching the new intersection location, in the storage, in association with the new intersection location based on the surrounding vehicle information.

7. The driving assistance device according to claim 1, wherein the controller is configured to register an azimuth in which the self-vehicle faces when entering the new intersection location, in the storage, in association with the new intersection location based on the traveling trajectory of the self-vehicle.

8. The driving assistance device according to claim 1, wherein, in a case where the new intersection location is specified within a predetermined range from at least one of the plurality of intersection locations stored in the storage, the controller is configured to register the new intersection location in the storage by correcting the at least one intersection location with the new intersection location.

9. The driving assistance device according to claim 1, wherein, in a case of determining that a plurality of the surrounding vehicles have passed through the predetermined area, the controller is configured to specify, as the new intersection location, a representative value of a location where a traveling trajectory of each of the plurality of the surrounding vehicles and the traveling trajectory of the self-vehicle intersect.

10. A driving assistance device comprising:

a storage configured to store a plurality of intersection locations each indicating a location where a traveling trajectory of a self-vehicle and a traveling trajectory of another vehicle intersect in a past; and a controller configured to control driving assistance for the self-vehicle based on each of the plurality of intersection locations, wherein the controller is configured to:

acquire surrounding vehicle information including a traveling trajectory of a surrounding vehicle present around the self-vehicle, from the surrounding vehicle, through vehicle-to-vehicle communication;

determine, as a candidate point for specifying a location where the self-vehicle and the surrounding vehicle intersect, a point at which the self-vehicle starts to accelerate after decelerating to a speed threshold value or less or a point at which the self-vehicle temporarily stops;

specify, as a new intersection location, a location where the traveling trajectory of the self-vehicle and the traveling trajectory of the surrounding vehicle intersect in a case of determining that the surrounding vehicle has passed through a predetermined area set for the candidate point based on the acquired surrounding vehicle information; and register the specified new intersection location in the storage, wherein the predetermined area is a quadrangular area whose three sides are a first virtual line, a second virtual line connected to one end point of the first virtual line, and a third virtual line connected to the other end point of the first virtual line and whose remaining one side is open, and the controller is configured to:

in a case of determining that the surrounding vehicle is present in a left or right direction of the self-vehicle based on the surrounding vehicle information, set the predetermined area opened in a direction in which the surrounding vehicle is present by setting a line including the candidate point and extending in a vehicle width direction of the self-vehicle as the second virtual line, and in a case where the surrounding vehicle crosses any one of the first virtual line, the second virtual line, and the third virtual line from inside to outside of the predetermined area, determine that the surrounding vehicle has passed through the predetermined area.

11. The driving assistance device according to claim 10, wherein the controller is configured to set the predetermined area such that a length of the second virtual line and a length of the third virtual line are equal to or greater than a length of the first virtual line.

* * * * *